US010110657B2

(12) United States Patent
Mitic et al.

(10) Patent No.: US 10,110,657 B2
(45) Date of Patent: Oct. 23, 2018

(54) SYSTEM AND METHOD FOR PUSHING LIVE MEDIA CONTENT IN AN ADAPTIVE STREAMING ENVIRONMENT

(71) Applicant: TELEFONAKTIEBOLAGET L M ERICSSON (PUBL), Stockholm (SE)

(72) Inventors: Richard Mitic, Stockholm (SE); Beatriz Grafulla-González, Solna (SE); Robert Swain, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 369 days.

(21) Appl. No.: 14/484,850

(22) Filed: Sep. 12, 2014

(65) Prior Publication Data
US 2016/0006817 A1 Jan. 7, 2016

Related U.S. Application Data

(60) Provisional application No. 62/020,557, filed on Jul. 3, 2014.

(51) Int. Cl.
*G06F 15/16* (2006.01)
*H04L 29/08* (2006.01)
(Continued)

(52) U.S. Cl.
CPC .......... *H04L 67/02* (2013.01); *H04L 65/4076* (2013.01); *H04L 65/4084* (2013.01);
(Continued)

(58) Field of Classification Search
CPC . H04L 43/0852; H04L 65/601; H04L 43/087; H04L 63/102; H04L 65/4084; H04L 12/1859; H04L 67/306; H04L 67/02; H04L 65/80; H04L 65/4076; H04N 21/2662; H04N 21/23439
(Continued)

(56) References Cited

U.S. PATENT DOCUMENTS 7,835,283 B2 * 11/2010 Raisanen .......... H04L 12/40065
370/235
2012/0124179 A1 * 5/2012 Cappio ................. H04L 65/104
709/219
(Continued)

OTHER PUBLICATIONS

Bouzakaria, et al.: "Overhead and Performance of Low Latency Live Streaming using MPEG-DASH". Paris France.
(Continued)

Primary Examiner — Tonia L Dollinger
Assistant Examiner — Kristoffer L S Sayoc

(57) ABSTRACT

A system and method for pushing live media to a client device in an adaptive streaming environment. In one aspect, a media server configured to transmit live media includes a storage unit for storing media segments of a live media programming stream, wherein the media segments are encoded at multiple bitrates identified in respective media presentation data structures associated therewith. A websocket interface is provided that is operative to facilitate a websocket session with the client device. One or more processors of the system are operative to execute service logic for pushing the media segments to the client device substantially in real time during the websocket session.

17 Claims, 15 Drawing Sheets

(51) Int. Cl.
*H04L 29/06* (2006.01)
*H04L 12/26* (2006.01)

(52) U.S. Cl.
CPC ............ *H04L 65/608* (2013.01); *H04L 65/80* (2013.01); *H04L 43/087* (2013.01); *H04L 43/0811* (2013.01); *H04L 43/0894* (2013.01)

(58) Field of Classification Search
USPC ................................................ 709/232, 226
See application file for complete search history.

(56) References Cited

U.S. PATENT DOCUMENTS

| | | | | |
|---|---|---|---|---|
| 2013/0041934 A1* | 2/2013 | Annamalaisami | .... | H04L 43/026 709/203 |
| 2013/0054743 A1* | 2/2013 | Feher | .................. | H04L 65/4076 709/217 |
| 2013/0114482 A1* | 5/2013 | Oh | ...................... | H04L 12/6418 370/310 |
| 2014/0006564 A1* | 1/2014 | Thang | ................... | H04L 65/601 709/219 |
| 2014/0032777 A1* | 1/2014 | Yuan | ....................... | H04L 67/26 709/231 |
| 2014/0201335 A1* | 7/2014 | Wang | .................. | H04L 65/4092 709/219 |
| 2014/0215085 A1* | 7/2014 | Li | ....................... | H04L 65/4084 709/231 |
| 2014/0215536 A1* | 7/2014 | Maxwell | .......... | H04N 21/47202 725/87 |
| 2014/0222930 A1* | 8/2014 | Gangadharan | .......... | H04L 51/04 709/206 |
| 2016/0212496 A1 | 7/2016 | Lau et al. | | |

OTHER PUBLICATIONS

Lohmar, et al.: "Dynamic Adaptive HTTP Streaming of Live Content". 2011, IEEE.
Bhat, et al.: "An Architectural Approach Towards Achieving Bandwidth-Efficient Content Delivery". 2016.

* cited by examiner

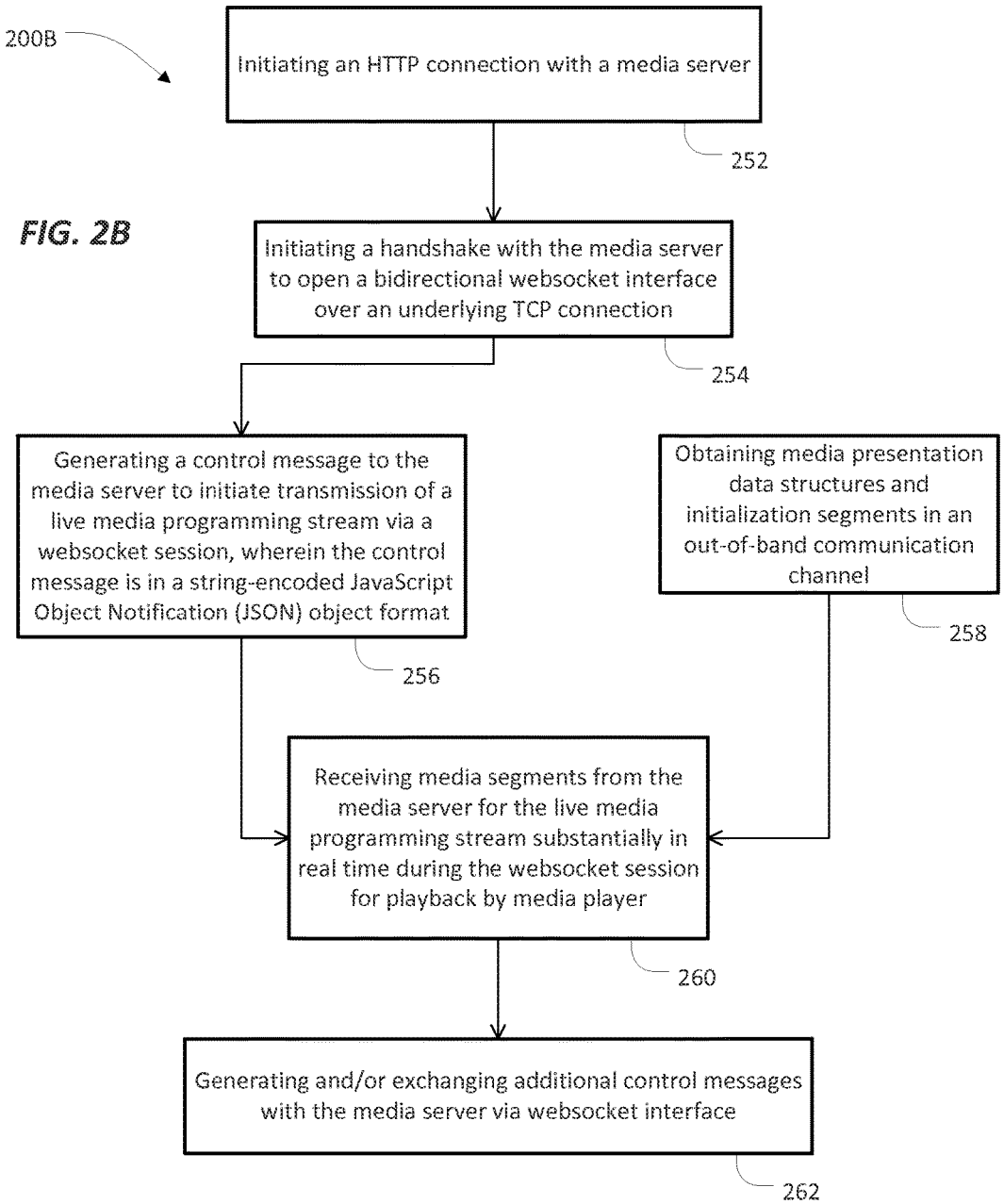

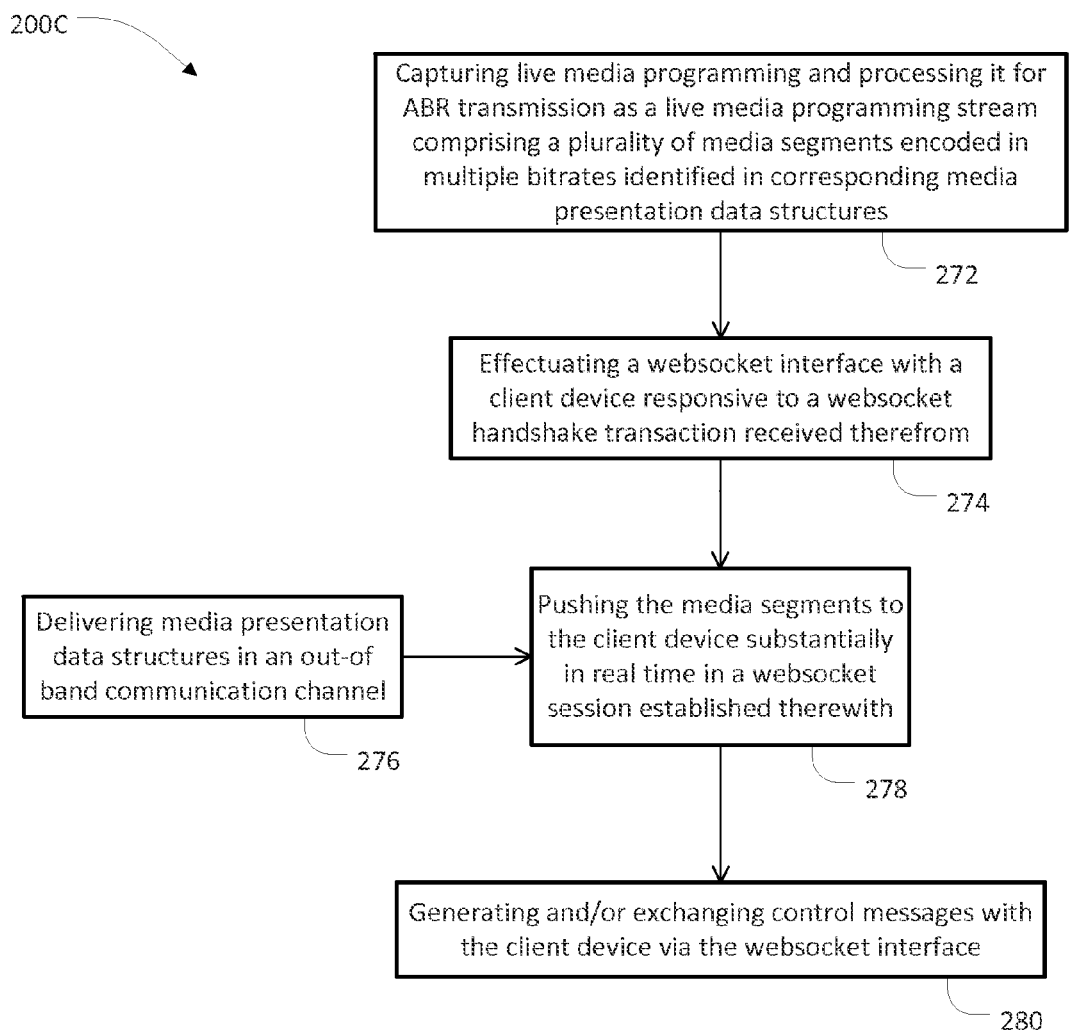

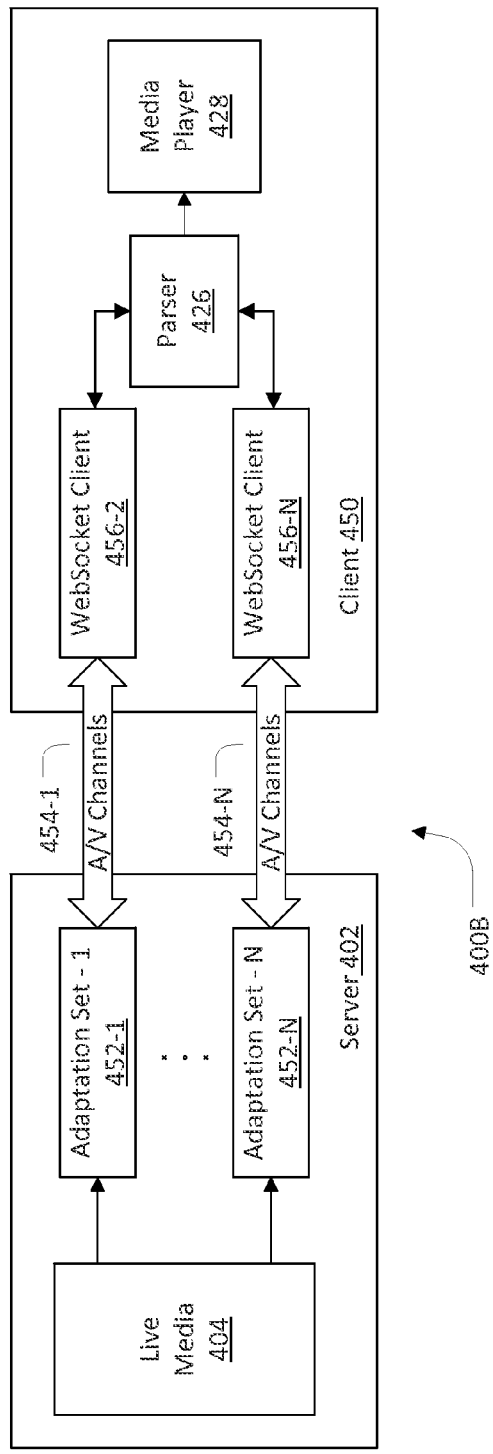

SYSTEM AND METHOD FOR PUSHING LIVE MEDIA CONTENT IN AN ADAPTIVE STREAMING ENVIRONMENT

PRIORITY UNDER 35 U.S.C. § 119(e) & 37 C.F.R. § 1.78

This nonprovisional application claims priority based upon the following prior United States provisional patent application(s): (i) "SYSTEM AND METHOD FOR PUSHING LIVE MEDIA CONTENT IN AN ADAPTIVE STREAMING ENVIRONMENT," Application No. 62/020,557, filed Jul. 3, 2014, in the name(s) of Richard Mitic, Beatriz Grafulla-González and Robert Swain; each of which is hereby incorporated by reference in its entirety.

FIELD OF THE DISCLOSURE

The present disclosure generally relates to communication networks. More particularly, and not by way of any limitation, the present disclosure is directed to a system and method for pushing live media content in an adaptive streaming environment.

BACKGROUND

Adaptive streaming based on HyperText Transfer Protocol (HTTP) has become a popular approach for delivering multimedia content over the Internet. Typical streaming implementations use a "client-controlled" methodology in which the client requests media segments from the server at an appropriate time, which it then processes and renders. Data transfer takes place over HTTP, the infrastructure for which is far more widespread than that of other media streaming protocols such as Real-time Transport Protocol (RTP) and Real Time Streaming Protocol (RTSP).

SUMMARY

For adaptive live media streams, it is desirable to reduce the overall end-to-end delay so that the media as viewed by the end consumer is as close as possible in time to reality. Delays may be caused by several factors as outlined in FIG. 10, the sum of which is the overall end-to-end delay 1000. For example, with respect to a live event 1002, there is a delay component relative to media capture, encoding, and processing 1004. Upon saving the segments 1006, there is a "padding" delay 1008 until the segments are requested 1010. A network transfer delay component 1012 may be experienced relative to when a requested segment is received, as illustrated by reference numeral 1014. Client buffering 1016 prior to decoding and rendering 1018 adds yet another delay component. For live media streams (i.e., media being generated on-the-fly at the server), it is typical in some implementations that a parameterized URL is given to the client via a suitable manifest file. In such scenarios, the client may construct a URL for a media segment based on the several parameters including the current wall-clock time and the current position in the media playback timeline. In another approach, the media segments may be listed explicitly. Regardless of whether the length of each media segment is stated in the manifest file or otherwise, it is not required that all segments are exactly the stated length. This leads to a slight jitter in the times at which each media segment is made available on the server. To account for this, it is normal to delay a segment request for some time in order to allow sufficient leeway for time variations at the server. In FIG. 10, this is illustratively shown as padding 1008. This adds to the overall end-to-end delay 1000 of the live media stream, which is clearly undesirable in a live media presentation.

In addition, it is common to see clock drift between the client and associated server in a streaming environment. In an embodiment based on the Moving Picture Expert Group (MPEG) Dynamic Adaptive Streaming over HTTP (MPEG-DASH) technology, this may be partially corrected by the addition of a timing element, e.g., the <UTCTiming> element in Amendment 1 of the ISO/IEC 23009-1 specification, which allows both server and client to be synchronized to a common clock. The time resolution of this clock is not defined, but it is a non-zero value and might typically be on the order of a second or longer. Hence, there is still a chance of a client attempting to access a media segment that does not exist yet, especially when trying to keep as close as possible to the "live point". Further, there is no normative behavior defined for the situation where a client encounters a HTTP 404 response (i.e., the requested media segment does not exist). A server therefore cannot fully prepare for a situation where clients are requesting media segments erroneously.

Embodiments of the present disclosure are broadly directed to systems, methods, devices, apparatuses and associated computer-readable media for advantageously pushing live media content in an adaptive bitrate (ABR) streaming environment in view of the foregoing. To that end, various embodiments may be generally grouped relative to the following aspects. First, live media can be pushed to the client using a persistent socket connection over HTTP (hereinafter referred to as a websocket connection), as will be set forth in detail hereinbelow. This will eliminate need for a client device to request media at the correct time, and hence will reduce end-to-end delay and avoid HTTP 404 responses. In essence, the length of padding may be minimized to zero. This also has the advantage that clock drift between the client and server can be corrected every time the client receives a segment. During the playout of segment, there may still be drift, but it will be negligible if corrected frequently, as will be seen below. Secondly, a set of defined messages and session protocols are set up according to the teachings herein in order for the server and client to communicate successfully in the disclosed implementations. In an example scenario, this will cover communication between client and server during a persistent socket connection as will be described below. The same socket connection may be generalized to cover other forms of client-server communication, e.g. metric reporting or SAND (Server and Network Assisted DASH Operation) communication. Thirdly, several embodiments for measuring network metrics (e.g., bandwidth rate, download speeds, congestion, etc.) in a live media presentation environment are set forth.

Accordingly, in one aspect, an HTTP connection is initiated by the client device with a "media server," which for purposes of the present patent application may comprise a general HTTP sever configured for adaptive streaming. A handshake transaction is effectuated with the media server to open a websocket interface over an underlying transport layer (e.g., a Transmission Control Protocol or TCP connection). A bidirectional websocket session is effectuated between the media server and associated client device wherein the media segments of a live media programming stream are delivered to the client device substantially in real time without the client device sending requests therefor, whereby undesirable characteristics such as delay and/or latency (e.g., associated with padding, etc.) are eliminated or reduced. It should be appreciated that an embodiment of the HTTP media server is therefore operative to maintain and/or provide the media segments without padding regardless of the segment lengths.

In another aspect, a further embodiment of a media server configured to transmit live media to a client device is disclosed. The claimed media server comprises, inter alia, a storage unit for storing media segments of a live media programming stream wherein the media segments are encoded at multiple bitrates identified in respective media presentation data structures associated therewith. A persistent bidirectional communication channel over a websocket interface is provided operative to facilitate a websocket session with the client device. The media server further includes one or more processors executing service logic for pushing the media segments to the client device substantially in real time during the websocket session.

In yet another aspect, an embodiment of a client device configured to receive live media from a media server in a push-based streaming environment is disclosed. The claimed embodiment comprises, inter alia, one or more processors for controlling an HTTP client module and a websocket client module coupled thereto. The processors are operative to execute associated program instructions in conjunction with the client modules configured to perform: initiate an HTTP connection with the media server; initiate a handshake transaction with the media server to open a bidirectional websocket interface over an underlying TCP connection; facilitate generating a control message to the media server to initiate transmission of a live media programming stream in a websocket session; and facilitate receiving media segments from the media server of the live media programming stream substantially in real time during the websocket session for playback by a media player of the client device.

In a further aspect, an embodiment of a method operative at a media server system is disclosed. The claimed embodiment comprises, inter alia, capturing live media programming associated with an event and processing the live media programming for ABR transmission as a live media programming stream comprising a plurality of media segments that are encoded in multiple bitrates identified in corresponding media presentation data structures. The method further involves effectuating a websocket interface with a client device responsive to a websocket handshake transaction received therefrom and pushing the media segments to the client device substantially in real time during a websocket session established with the client device via the websocket interface.

In still further aspects, additional or alternative embodiments of methods operative at a media server and associated client device are disclosed. In still further related aspects, embodiments of non-transitory computer-readable media containing program instructions or code portions stored thereon are disclosed for performing one or more processes, methods and/or schemes set forth herein.

Advantages of the present invention include, but not limited to, facilitating a live media presentation wherein clients may accept media segments without having to explicitly request them, which reduces the end-to-end delay and eliminates the risk of premature requests for media. A client device configured with one or more embodiments of the present disclosure may also evaluate the quality of the network connection even though it is not using the traditional "request-receive" methodology, as is required in the current implementations.

Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 2B is a flowchart with blocks relative to various steps and acts that may take place at a client device according to an embodiment of the present patent application;

FIG. 2C depicts a flowchart with blocks relative to various steps and acts that may take place at a live media server or system according to an embodiment of the present patent application;

FIGS. 4A-4C depict block diagrams corresponding to three example websocket connection architectures for implementation in a server-client environment for facilitating live media push according one or more embodiments of the present patent application;

DETAILED DESCRIPTION OF THE DRAWINGS

Figure 1:
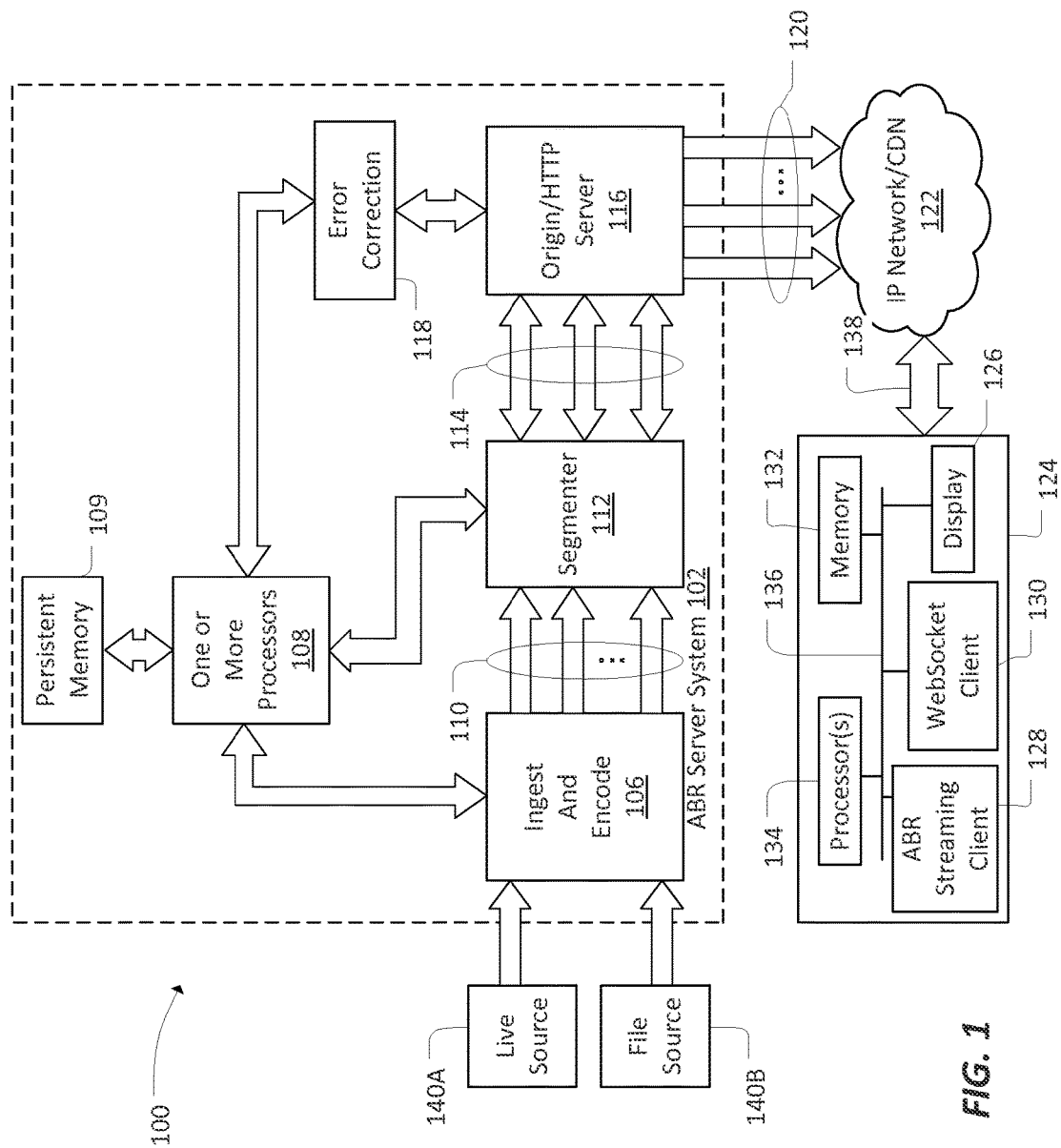
FIG. 1 depicts an example streaming network environment wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., NV media management, session control, QoS policy enforcement, bandwidth scheduling management, subscriber/device policy and profile management, content provider priority policy management, streaming policy management, and the like), in addition to providing support for multiple application services (e.g., data and multimedia applications). Subscriber end stations or client devices may comprise any device configured to execute, inter alia, at least one streaming client application (e.g., an ABR streaming client application) for receiving content from a streaming server or content provider in accordance with a streaming application specification. Further, such client devices may be configured to effectuate a websocket interface for establishing bidirectional websocket sessions with suitable media server nodes for real-time or substantially real-time transmission of live audio/video media (i.e., multimedia) as will be described in detail hereinbelow. Accordingly, example client devices may include set-top boxes, PVR/DVRs, workstations, laptops, netbooks, palm tops, mobile phones, smartphones, multimedia phones, Voice Over Internet Protocol (VOIP) phones, mobile/wireless user equipment, IP-connected high definition TV terminals, portable media players, location-aware subscriber equipment, gaming systems or consoles (such as the Wii®, Play Station 3®, Xbox 360®), etc., that may access or consume live content/services provided over a delivery network (e.g., an IP network) in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example streaming network environment 100 including a IP network and/or an overlay content delivery network or content distribution network (CDN) 122 coupled to an adaptive streaming server system 102 wherein one or more embodiments of the present patent application may be practiced. In one aspect, CDN 122 may comprise a delivery architecture over a public or private packet-switched network implemented for high-performance streaming of a variety of digital assets or program assets as well as services (hereinafter referred to as "media content"), including live media programming and/or on-demand content using HTTP. In general, the terms "media content" or "content file" (or, simply "content") as used in reference to at least some embodiments of the present patent disclosure may include digital assets or program assets such as any type of audio/video content that may comprise live capture media or on-demand media, e.g., over-the-air free network television (TV) shows or programs, pay TV broadcast programs via cable networks or satellite networks, free-to-air satellite TV shows, IPTV programs, Over-The-Top (OTT) and video-on-demand (VOD) or movie-on-demand (MOD) shows or programs, time-shifted TV (TSTV) content, etc. It will be appreciated by one of ordinary skill in the art that although the embodiments of the present disclosure are particularly advantageous in the context of live media streaming (i.e., capturing an event as a live media program and streaming that programming in real time over an IP/CDN architecture), the teachings herein are not necessarily limited thereto and, accordingly, one or more techniques set forth herein may also be equally applied in an on-demand streaming environment, mutatis mutandis.

By way of illustration, content may be delivered via IP/CDN 122 using adaptive bitrate (ABR) streaming techniques compliant with specifications such as, e.g., MPEG-DASH, Microsoft® Silverlight® Smooth Streaming, HTTP Live Streaming (HLS), HTTP Dynamic Streaming (HDS), Icecast, and so on, to one or more subscriber end stations disposed in the streaming environment 100, as illustrated by an example client device or user equipment (UE) device 124. It will be apparent that one or more such client devices may be associated with a subscriber/customer for consuming content delivered via CDN 122 in any type or number of access technologies including broadband access via wired and/or wireless (radio) communications. For purposes of the present patent application, the terms "streaming client device" and "client device" may be used synonymously and may comprise any UE device or appliance that in one implementation not only receives program assets for live viewing, playback and/or decoding the content, but also operates as a command console or terminal that can accept user inputs, messages, commands or requests to interact with a network element disposed in CDN 122 and/or the associated streaming server systems 102 for controlling transmission of content via a bidirectional interface. As such, the example client device 124 may include one or more streaming client modules 128 (e.g., an ABR streaming client) and associated decoding functionalities depending on the streaming technologies implemented (e.g., MPEG-DASH) as well as a websocket client module 130 operative to effectuate one or more persistent connections with the server system 102 via a bidirectional or full-duplex communication interface 138. The streaming client module(s) 128 and the websocket client module 130 are operably coupled to a processor module 134 and video buffer memory 132 via a suitable bus structure 136 for effectuating acquisition, decoding and rendering of the streamed media content, e.g., at a display 126. Although not specifically shown, the client device 124 also includes appropriate user interfaces for viewing one or more electronic program guides that list, identify or otherwise show various streaming channels (live media and//or on-demand) the subscriber is able to receive. Such user interfaces may also be configured to allow the user to scroll through an electronic program guide (i.e., channel surfing), select or otherwise change a particular streaming channel, and the like. Further, as will be described in additional detail hereinbelow, example client device 124 may also include appropriate structures and modules operating in conjunction with or as part of the websocket client 130 for facilitating real-time transmission of media from the server system 102.

Continuing to refer to FIG. 1, the example adaptive streaming server system 102 may be configured to accept media content from live sources 104A and/or, optionally, static file sources 104B. Media content from live sources 104A may comprise live programming captured relative to any type of event, e.g., sporting/entertainment/gaming events, concerts, live TV shows, live news broadcasting, etc. In general operation, the example streaming server system 102 may be configured, under the control of one or more processors 108 executing appropriate program code stored in a persistent memory module 109, to effectuate adaptive streaming of content as follows. Initially, source media content is transcoded or otherwise encoded with different bit rates (e.g., multi-rate transcoding) using applicable encoder(s) 106. For example, content of a particular program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions" or "formats", wherein each bitrate is called a profile or representation. Reference numeral 110 refers to a collection of media streams encoded at different bitrates by the encoder 106. A segmentation server or segmenter 112 is operative to divide each version of the encoded media content into fixed duration segments or chunks, which are typically between two and ten seconds in duration, thereby generating a plurality of chunk streams 114. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more suitable metadata files referred to as Manifest Files are then created that describes the encoding rates and Uniform Resource Locator (URL) pointers the various segments of encoded content. In one implementation, the Manifest File (MF), a Delivery Format (DF) and means for conversion from/to existing File Formats (FF) and Transport Streams (TS) may be provided by an origin/HTTP server 116 as part of adaptive streams 120 to the client device 124 over CDN/IP network 122. As will be described in detail hereinbelow, once a full-duplex websocket interface has been established between the client device 126 and the server 116, media segments of a live media programming may be pushed to the client device 124 without the client device specifically issuing HTTP requests to fetch the encoded segments. Additionally or optionally, in a further variation, an error correction mechanism 118 may also be implemented, either as part of the streaming server system 102 or as a separate network element, in order to reduce transmission errors in the end-to-end streaming of the encoded media content. It should be apparent that the error correction mechanism 118 may be protocol-specific (e.g., TCP), although other error correction schemes may also be used additionally or alternatively.

Figure 2A:
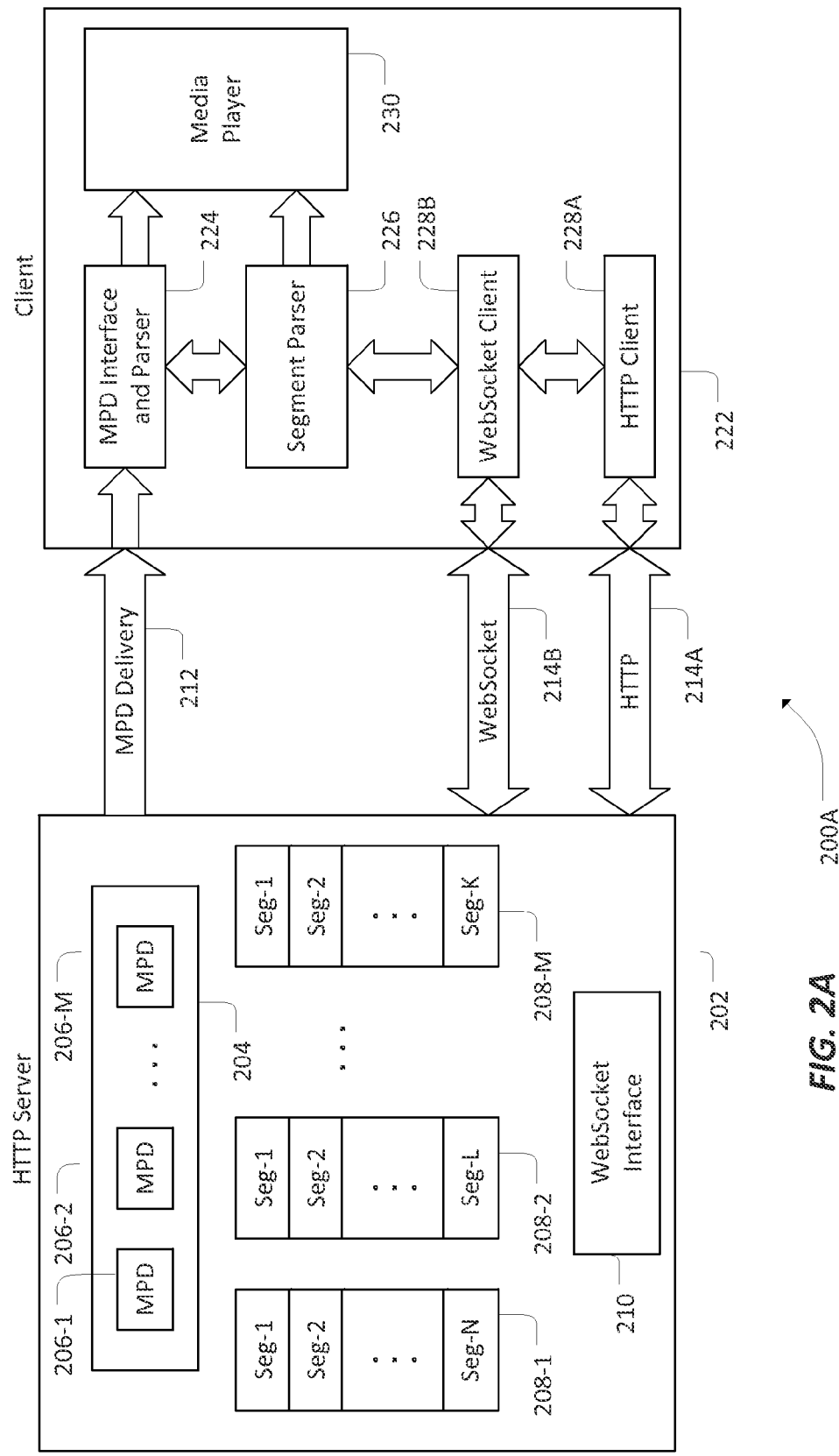
FIG. 2A depicts a block diagram of a server-client architecture for pushing media using websocket interfacing according to an embodiment of the present patent application.

FIG. 2A depicts a block diagram of an example server-client architecture 200A for pushing media using websocket interfacing according to an embodiment of the present patent application that involves MPEG-DASH technology as set forth in ISO/IEC 23009-1 specification. A persistent socket implementation between a DASH/HTTP server 202 and associated client device 222 using the WebSocket protocol (standardized by the Internet Engineering Task Force (IETF) as RFC 6455) and associated WebSocket API (standardized by the World Wide Web (W3) Consortium (W3C) in Web IDL (Web Interface Definition Language)) in accordance with the teachings of the present patent application may be referred to as a "DASHSOCK" interface operative to effectuate DASH sessions over a websocket session that may involve one or more websocket connections. To provide a contextual setting for the websocket implementations of the present patent application, interaction between DASH server 202 and associated client device 222 will be set forth below, although it should be appreciated that the implementations may be extended to other ABR streaming technologies as well, mutatis mutandis.

Configured as a live multimedia server, DASH server 202 is operative to cooperate with media capture, encoding, and segment processing as set forth above in reference to FIG. 1, wherein a live multimedia program content may be partitioned into a plurality of segments whose manifest file information may be provided in one or more hierarchically-organized metadata structures referred to as Media Presentation Description (MPD) files (more generally, media presentation data structures). Broadly, an MPD structure is an Extensible Markup Language (XML) document that describes segment information (timing, absolute/relative URLs, media characteristics such as video resolution and bitrates). Reference numeral 204 collectively refers to one or more MPDs 206-1 to 206-M pertaining to one or more live media programs adapted to be streamed in real time to client devices. The actual content of the live multimedia programming streams is illustratively shown as groups of segments 208-1 to 208-M, in one or more representations (i.e., the same multimedia content in multiple versions encoded at different resolutions or bitrates) that may be pushed to the client device 222 in a websocket session effectuated by a websocket interface 210 pursuant to suitable service logic.

Figure 3:
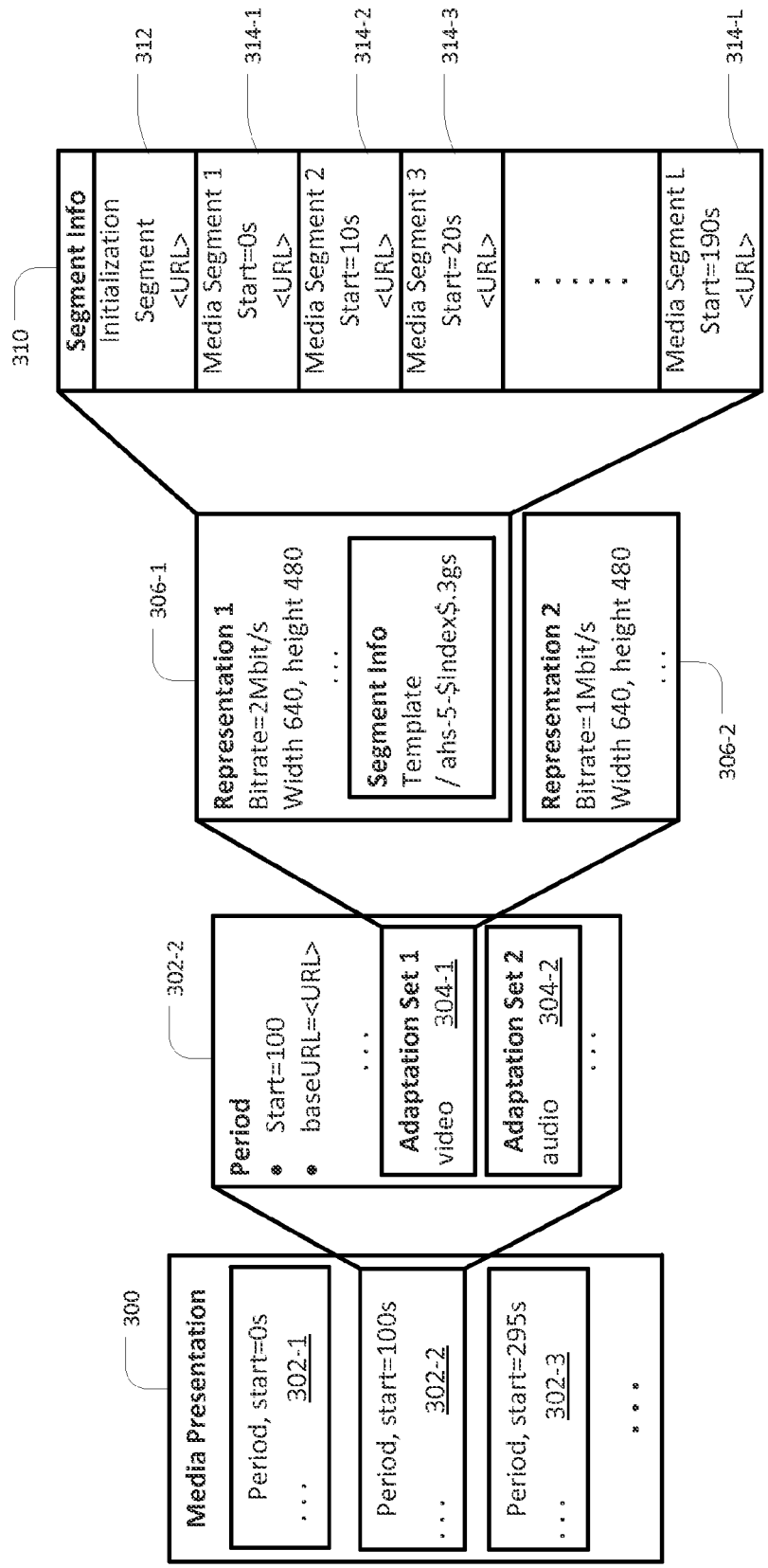
FIG. 3 depict an example media presentation data structure associated with media segments of a live media programming stream according to a streaming specification for purposes of the present patent disclosure.

FIG. 3 depicts an example MPD data structure model 300 that is illustrative of hierarchical organization of the metadata relative to different media segments of a particular content. In general, MPD 300 contains one or more periods, e.g., periods 302-1 to 302-3, that may be ordered in ascending chronological order (i.e., increasing in time) with a start time and associated time duration. Each period (e.g., period 302-2) includes one or one or more adaptation sets for different asset components, each adaptation set comprising one or more representations. Representations in the same adaptation set are alternatives to each other and typically contain different encoded versions of the same source media content and may include parameters such as language, media component type, picture aspect ratio, accessibility, etc. As illustrated, reference numerals 304-1 and 304-2 respectively refer to a video adaptation set and an audio adaptation set of period 302-2. The video adaptation set 304-1 in turn includes two representations 306-1 and 306-2, each having respective bitrates, display resolutions, etc. in addition to the segment metadata information 310. By way of further illustration, segment metadata information 310 includes an initialization segment 312 as well as media segment metadata portions 314-1 to 314-L, each segment metadata portion including URLs to media segments as well as associated timing parameters.

Referring back to FIG. 2A, MPDs may be delivered or otherwise provided to the client device 222 via a number of transports, e.g., using HTTP, email, broadcast, etc., as exemplified by path 212, some of which may be in an out-of-band mechanism relative to the media transport itself. An MPD delivery interface and parser 224 is provided with the client device 222 for parsing the MPD metadata. By parsing the MPD metadata information, a DASH client application running on the client device 222 is operative to learn about the program timing, media/content availability, media types, resolutions, range of bandwidths, and the existence of various encoded versions, accessibility features, media locations on the network, any required digital rights management (DRM), and other content characteristics. A segment parser 226, HTTP client 228A and a media player 230 may be provided as part of the client device 222 for facilitating live media streaming in conjunction with a websocket client 228B. Although the client device 222 uses HTTP for traversing existing network intermediaries via connection 214A in order to reach the server 202, a persistent pathway 214B using the WebSocket protocol that is independent from the HTTP protocol may be established with websocket interface 210 of the server 202 for facilitating one or more bidirectional communication channels in multiple connection architectures as will be described in detail below.

As one skilled in the art will appreciate, in an implementation of the WebSocket protocol and associated API within the DASH server-client architecture as set forth above, the client device 222 uses HTTP to communicate with the server 202, and then both endpoints switch to using the underlying connection (e.g., TCP or TCP/SSL) that HTTP is layered on to establish an end-to-end TCP/SSL socket connection for bidirectional application communication (i.e., streaming). As such, the WebSocket protocol is an independent TCP-based protocol that comprises a handshake part and a data transfer part. To establish a websocket connection, the client device 222 sends a websocket handshake request, responsive to which the server 202 returns a websocket handshake response, whose example formats may take on the form as shown in the following illustration:

Client request:
GET/application HTTP/1.1
Host: server.example.com
Upgrade: websocket
Connection: Upgrade
Sec-WebSocket-Key: x3JJHMbDL1EzLkh9GBhXDw==
Sec-WebSocket-Protocol: application
Sec-WebSocket-Version: 13
Origin: http://example.com
Server response:
HTTP/1.1 101 Switching Protocols
Upgrade: websocket
Connection: Upgrade
Sec-WebSocket-Accept:
   HSmrc0sMlYUkAGmm5OPpG2HaGWk=
Sec-WebSocket-Protocol: application Once the client 222 and server 202 have both sent their handshakes, and if the handshake transaction was successful, appropriate data transfer may be commenced with respect to facilitating real-time media streaming. After a successful handshake, the client 222 and server 202 may send data back and forth asynchronously in conceptual units known as messages that may be in textual format or in binary data format. In accordance with the teachings of the present patent disclosure, text messages may be configured for transmitting control messages (between the client 222 and server 202) to modulate or otherwise control a live media streaming session and binary data may be used for sending media segments to the client device 222. Other data such as MPD files and/or initialization segments may be obtained by the client device 222 via channels other than the websocket channel. These processes are formalized in the flowcharts of FIGS. 2B and 2C described below.

Taking reference to FIG. 2B in particular, depicted therein are a plurality of blocks relative to various steps and acts that may take place at a client device, e.g., client 222 in FIG. 2 above and/or other embodiments of a client device set forth in the following sections, according to an implementation. At block 252, the client device is operative to initiate an HTTP connection with a media server configured to transmit live media in an ABR streaming environment. At block 254, the client device is operative to initiate a handshake transaction with the media server to open a bidirectional websocket interface operable with TCP or other transport. As described previously, the client device is also operative to receive media presentation data structures or manifest files (e.g., MPD files) via HTTP or some other out-of-band delivery mechanism (block 258). Based on the received metadata information, a control message may be generated by the client device to the media server to initiate transmission of a live media programming stream via a websocket session (block 256). Initialization segments may also be obtained via normal HTTP GET requests generated to the media server system. Thereafter, the client device continues to receive media segments continuously substantially in real time during the socket session for playback by the client device's media player without having to generate requests for segments (e.g., HTTP GET requests) as set forth at block 260. Depending on network conditions and other factors, additional control messages may be generated and exchanged with the media server via the websocket interface to modulate or otherwise control the streaming experience (block 262).

FIG. 2C depicts a flowchart with blocks relative to various steps and acts that may take place at a live multimedia server or system (e.g., server 102/202 and/or other implementations hereinbelow) according to an embodiment of the present patent application. At block 272, live multimedia programming associated with an event is captured and processed for ABR transmission as a stream comprising a plurality of media segments encoded in multiple bitrates identified in corresponding media presentation data structures. A websocket interface is effectuated with a client device responsive to a websocket handshake transaction received therefrom (block 274). As described hereinabove, the server system is also operative to deliver the media presentation data structures or manifest files via HTTP or some other out-of-band delivery mechanism (block 276). Appropriate initialization segments may also be delivered to the client device by way of HTTP. Responsive to a control message from the client device via the websocket interface, the media server system is operative to transmit the media segments as binary data to the client device substantially in real time, (i.e., pushing), for example, as soon as the segments become available, without waiting for explicit requests from the client device (block 278). Although control of the media flow may largely remain on the client side consistent with the MPEG-DASH specification, the media server system may also generate certain control messages as well as control message responses for transmission to the client device via the websocket interface (block 280).

As pointed out previously, textual messages may be used for transmitting control messages (e.g., requests from the client device to the server, responses from the server to the client, etc.). Although binary data is primarily used for transmission of media segments to the client device, control messages in binary data format may also be developed in additional or alternative implementations. In one embodiment, the textual control messages may be formatted in the form of string-encoded JavaScript Object Notation (JSON) objects, as set forth in the following example:

```
{
    "command": "start streaming",
    "parameters":
    {
        "from": "segment",
        "url": "representation_A/segment0000.m4s"
    }
}
```

One or more variations of the foregoing example format may be implemented by a client device, with additional parameterization as needed, to generate a number of JSON-formatted text messages as control messages to the media server. By way of illustration, set forth below are a plurality of control messages that a client device may generate to the media server:

(CM1) Start streaming from segment with specified URL: The client has all the normal MPD information, so this is a general way of selecting a point in the stream. May be used for Play/seek.

(CM2) Start streaming at "live point" with some specified delay: This is a special case of (CM1), where the client does not have to form a specified URL. May be used for Play/seek.

(CM3) Start streaming from last known position: May be used for Resume from pause.

(CM4) Start streaming from media time wall-clock time hh:mm:ss: May be used for Play/seek.

(CM5) Stop sending data but keep socket open: May be used for Pause.

(CM6) Switch to representation with ID XXX: Since server is in charge of sending media, client must initiate a request to switch, e.g., by using a control message in this form.

(CM7) Segment with relative URL xxx/yyy.zzz has been received: Acknowledgement message used for an embodiment of a bitrate measurement implementation described below.

In analogous fashion, a server may generate and forward the following example control messages to a client:

(SM1) Next segment will be from representation with ID XXX: Response to a switch request. Requires that the initialization segment for the coming representation has already been downloaded.

(SM2) End of stream: May be used or terminating a media stream. This could also be achieved by simply closing the websocket, but this may not be consistent with the "client-controlled" nature of a DASH implementation.

(SM3) Update MPD: May be used for out-of-band MPD updates.

(SM4) Following segment was sent at wall clock time hh:mm:ss: May be used for an embodiment of a bitrate measurement implementation described below.

(SM5) Current bandwidth is XXX bits/s: May be used for an embodiment of a bitrate measurement implementation described below.

Those skilled in the art will recognize that the foregoing control messages are merely examples and numerous additional or alternative messages (e.g., either in textual for binary format compliant with the WebSocket protocol) may be provided in other implementations within the scope of the present patent disclosure.

Figure 4A:
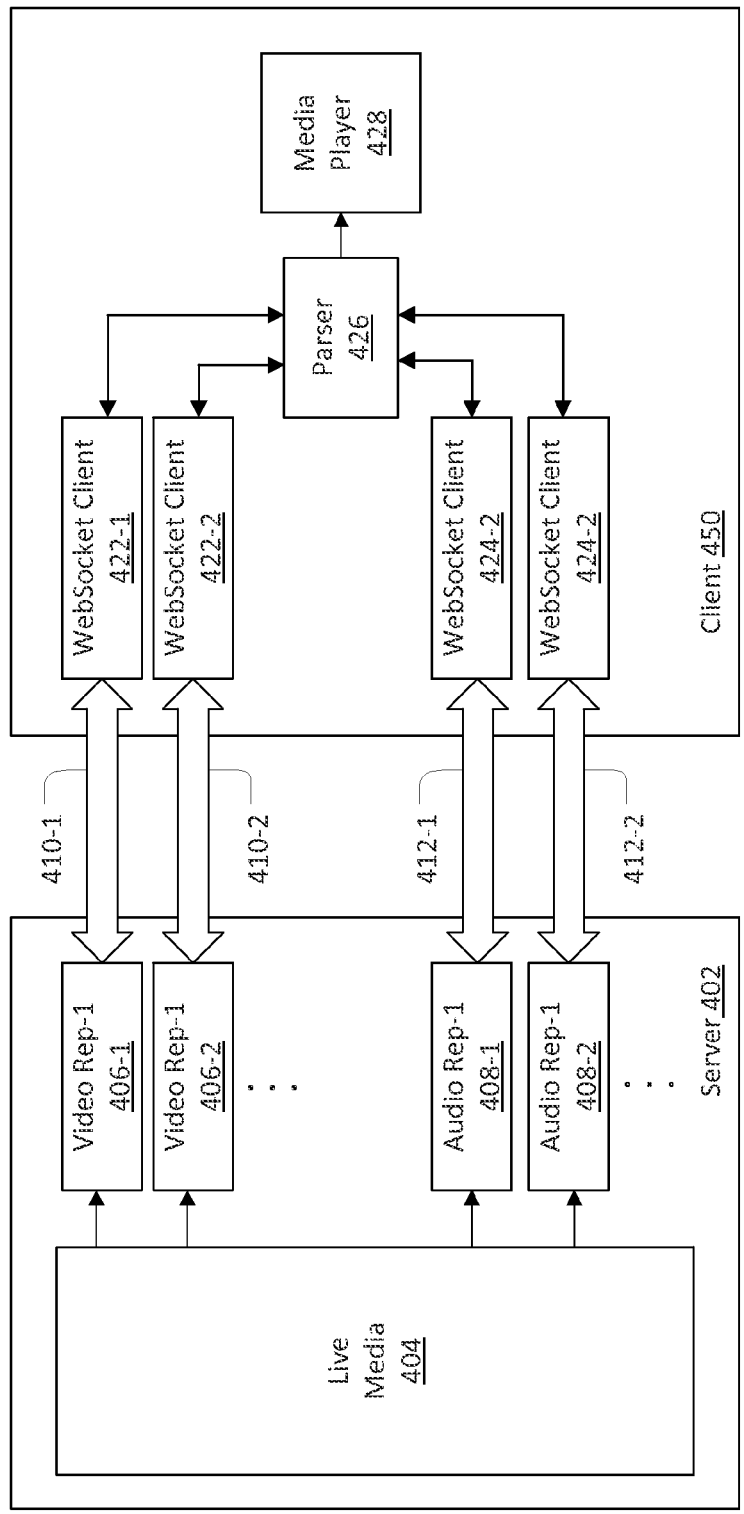

As to establishing websocket channels between a server and a client for live media streaming, several connection architectures may be implemented depending on the trade-offs between scalability and complexity. Turning now to FIGS. 4A-4C, depicted therein are block diagrams corresponding to three example websocket connection architectures for implementation in a server-client environment for facilitating live media push according one or more embodiments of the present patent application. Reference numeral 400A in FIG. 4A refers to a connection architecture where the websocket interfacing between server 402 and associated client device 450 is operative to establish a websocket connection per representation with respect to a live media stream 404. A plurality of video representations 406-1, 406-2 and a plurality of audio representations 408-1, 408-2 of the live media stream are each streamed via respective websocket connections as illustrated by video websocket connections 410-1, 410-2 and audio websocket connections 412-1, 412-2. The client device 450 may be provided with a plurality of websocket client modules, e.g., client modules 422-1/422-2 and 424-1/424-2, for facilitating the multiple websocket connections, although a single websocket module may be operative to manage the different websocket connections in another variation. Audio/video segments received via the respective websocket connections are provided to parser 426 for subsequent playback (i.e., rendering) by a media player 428.

One skilled in the art should appreciate that the foregoing implementation may not scale well because there could easily be numerous representations (e.g., 10 or more) in a single DASH presentation. This implies that the server would have to maintain many connections per client, thereby potentially impeding scalability. It may further imply that the server and client would have to react to messages sent on any connection, which may introduce unnecessary complexity.

FIG. 4B is illustrative of a connection architecture 400B wherein the websocket interfacing between server 402 and associated client device 450 is operative to establish a websocket connection per adaptation set as part of a websocket session for the live media stream 404. A plurality of adaptation sets 452-1 to 452-N are illustrated with respect to the live media stream 404, each of which may comprise video only, audio only or both audio/video representations. A plurality of websocket connections 454-1 to 454-N may be provided corresponding to respective adaptation sets 452-1 to 452-N. The client device 450 may be provided with one or more websocket client modules, e.g., client modules 456-1 to 456-N, for facilitating the multiple websocket connections. As before, audio/video segments received via the respective websocket connections for each adaptation set are provided to parser 426 for subsequent playback (i.e., rendering) by the media player 428. It will be appreciated that this implementation requires signaling of a representation switch from the server 402 to the client device 450.

Because of the hierarchical granularity of a media presentation metadata file, the number of adaptation sets is typically much lower than the number of representations. Accordingly, the embodiment shown in FIG. 4B may be more advantageous than the embodiment shown in FIG. 4A in terms of scalability. It will be further appreciated that this implementation may better fit semantically with the DASH specification, as by definition, a maximum of one media stream from each adaptation set will be requested or rendered at any time.

A highly scalable connection architecture 400C is shown in FIG. 4C wherein the websocket interfacing between server 402 and associated client device 450 is operative to establish a single websocket connection for the entire live media stream 404. Accordingly, all media of the presentation session is streamed via the single websocket connection 462 with the client 450. A websocket client module 464 operative with such a connection is provided as part of the client device 450, wherein audio/video segments received thereby are provided to parser 426 for subsequent playback by the media player 428. Although this embodiment provides the most scalable implementation, additional complexity is introduced that may be necessary at the client side for determining which representation or adaptation set a particular media segment belongs to. In one alternative variation, the server 402 may send the equivalent of header information before each media segment, identifying the representation and/or adaptation set of the segment, but such overhead signaling may add further complexity.

Figure 5A:
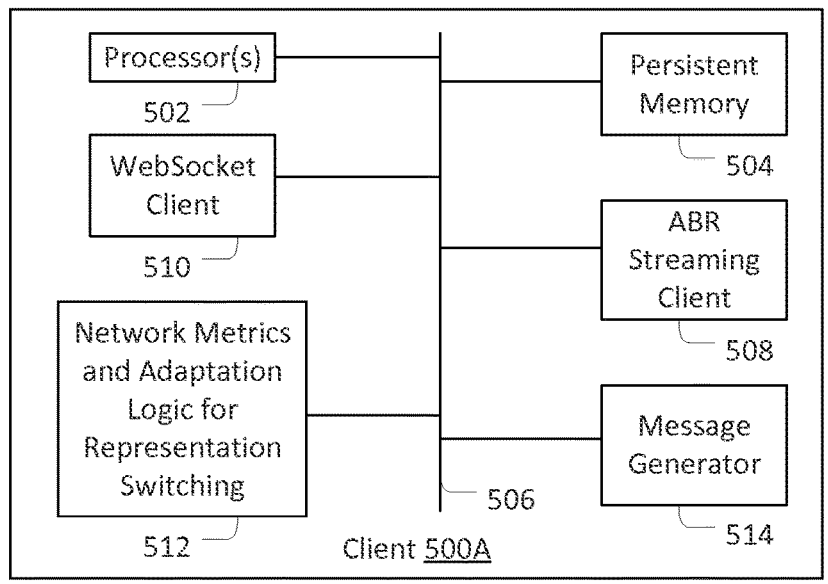
FIGS. 5A and 5B depict block diagrams of embodiments of a client device and a server, respectively, in additional detail for purposes of the present patent disclosure.
Figure 5B:
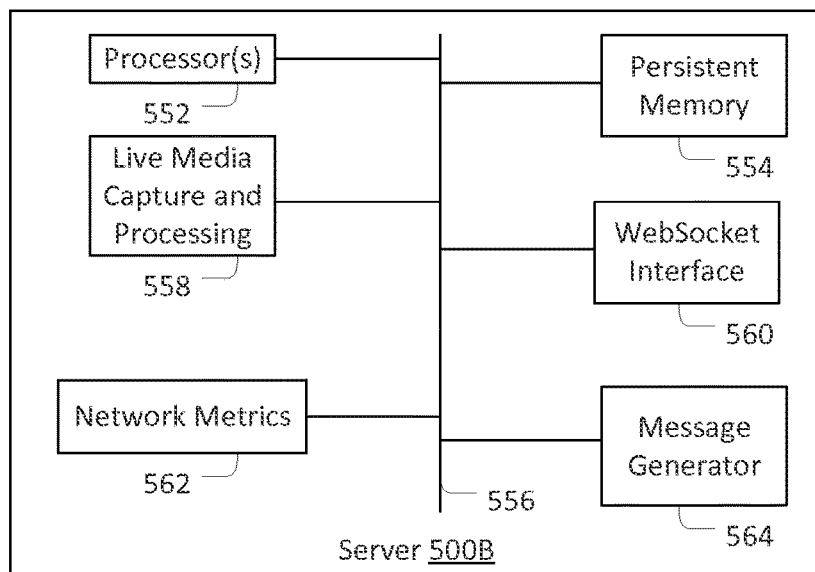

FIGS. 5A and 5B depict block diagrams of a client device 500A and a server 500B, respectively, in additional detail for purposes of the present patent disclosure. It will be appreciated by those skilled in the art that the client device 500A is an additional/complementary representation of one or more client device embodiments of the present patent application. One or more processors 502 are provided as part of the client device 500A for controlling a plurality of subsystems thereof, including those configured for facilitating live multimedia streaming. Suitable client applications, e.g., a websocket client module 510 and HTTP streaming client module 508, may be implemented as executable program code stored in nonvolatile memory coupled to the processors 502 via appropriate bus structure 506. Associated program instructions may be stored in memory, including persistent nonvolatile memory 504, that are executable by the processors 502. A control message generator 514 is operative to generate various control messages that may be formatted as string-encoded JSON text messages. As described previously, such textual messages may be utilized by the client device 500A for controlling a live media flow presentation. Because the client device 500A may need to make measurements of segment download speeds in order to determine network conditions for adaptive switching, a network metrics and adaptation logic block 512 is provided which may interoperate in conjunction with the websocket client module 510 and control message generator 514 under program control of processors 502. Since the client device 500A is configured to receive media segments without requesting in a push streaming scenario, conventional techniques based on the time in between requesting and receiving a media segment will not be of much assistance here. Accordingly, the network metrics unit 512 of client 500A is operative to execute various novel methodologies for measuring network performance including the jitter (i.e., delay between receiving consecutive segments) as will be set forth in detail hereinbelow.

Server 500B shown in FIG. 5B is an additional/complementary representation of one or more server embodiments of the present patent application. One or more processors 552 are provided as part of the server system 500B for controlling a plurality of subsystems thereof, including those configured for facilitating live multimedia streaming, e.g., a live media capture and processing unit 558 which may include or otherwise be associated with a storage unit for storing media segments and related MPD metadata. A websocket interface 560 is operably coupled to the processors 552 for facilitating a websocket session with a client device, e.g., client 500A. Persistent memory 554 coupled to the processors 552 is operative to store program code and other instructions comprising suitable service logic for pushing the media segments to the client device substantially in real time during the websocket session therewith. A control message generator 564 is operative to generate various control messages such as responses that may be formatted in a string-encoded JSON format, as described previously. Furthermore, the server system 500B may additionally/optionally include a network metrics unit 562 for facilitating measurement of network performance metrics in conjunction with the client device 500A in certain embodiments.

Figure 6A:
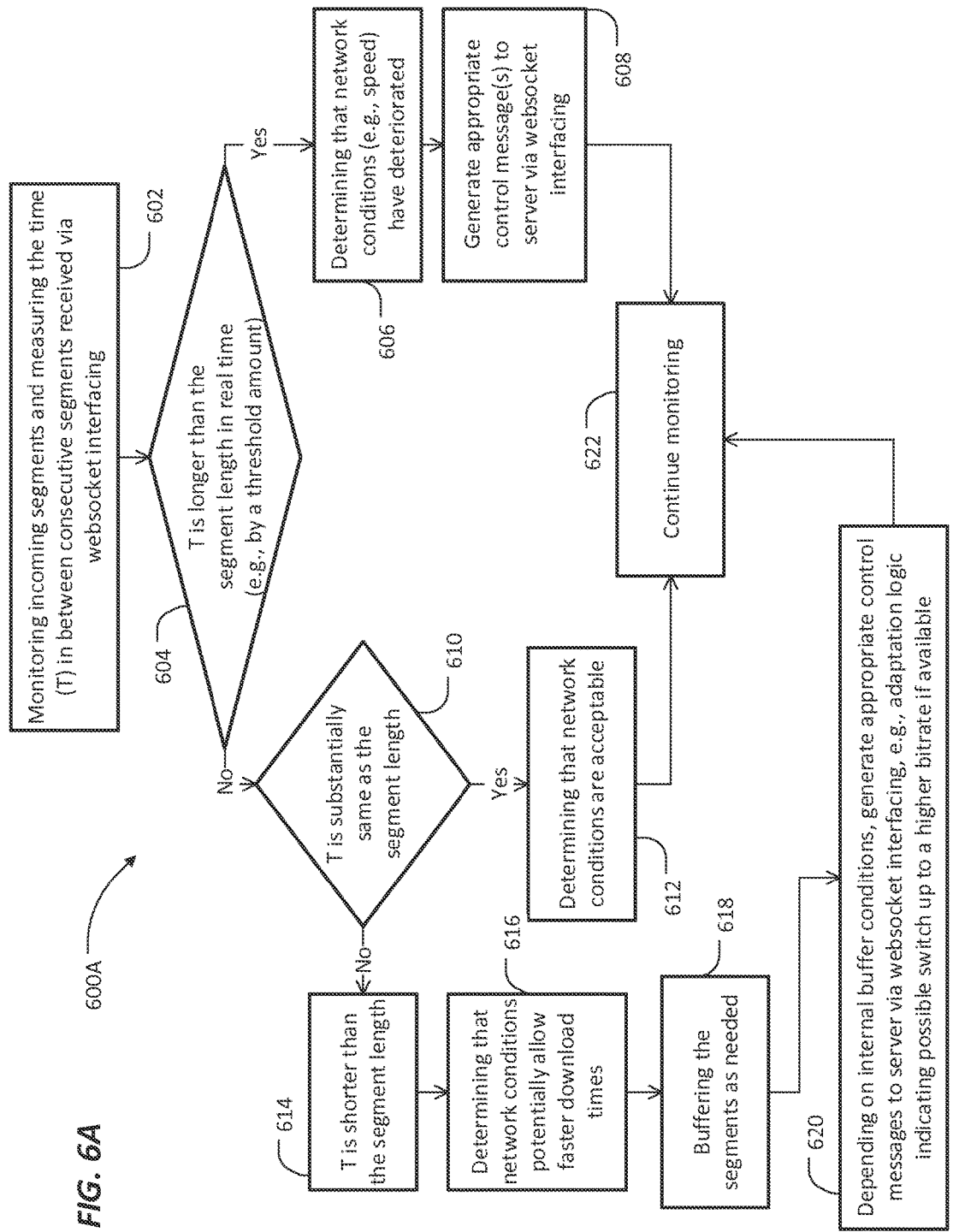
FIG. 6A is a flowchart with blocks relative to various steps and acts that may take place at a client device for measuring or otherwise estimating appropriate network performance metrics in a websocket-enabled streaming environment according to an embodiment of the present patent application.

Turning to FIG. 6A, depicted therein is a flowchart with blocks relative to various steps and acts that may take place at a client device for measuring or otherwise assessing appropriate network performance metrics in a websocket-enabled streaming environment according to an embodiment of a measurement methodology 600A of the present patent application. A generalized methodological framework with respect to the embodiment 600A is first set forth below in conjunction with FIG. 6B for analyzing segment jitter to determine network performance. As one skilled in the art will recognize upon reference hereto, in a live streaming environment, media segments are generated on the fly (in real time) that are also transmitted to the client in real time via the websocket connection therebetween. Because the client only knows when a segment is received but not when it was sent, it cannot measure the network speed in the traditional way. A client may therefore be provided with appropriate logic, structure or functionality configured to make accurate measurements of the time in between receiving consecutive segments as well as the length (in real time) of each segment (e.g., based on the client's wall-clock time). The length of a DASH segment is not required to be exactly that written in the MPD, but can be determined from the information contained within a particular data field, e.g., "sidx" box, as defined by the ISO Base Media File Format specification ISO/IEC 14496-12:2012.

Figure 6B:
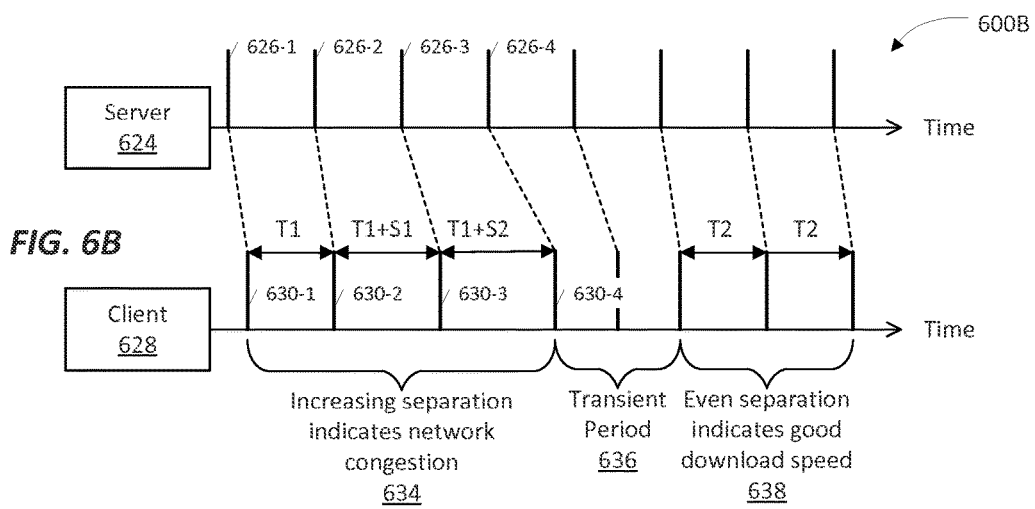
FIG. 6B depicts a graphical representation of media segment transmission in a temporal sequence that illustrates an aspect of the measurement methodology shown in the flowchart of FIG. 6A.

Referring to FIG. 6B, which depicts a graphical representation 600B of media segment transmission in a temporal sequence), it should be appreciated that in a steady state, the time between receiving consecutive segments at the client side would be equal to the segment length, wherein a server 624 is exemplified with sending a plurality of media segments at specific intervals of its wall-clock time, e.g., segments 626-1 to 626-4, and a client 628 is exemplified with receiving the segments at various times as referenced by its wall-clock, e.g., segments 630-1 to 630-4. If the client 628 measures that the time in between consecutive segments is slower than real time, a determination or estimation may be made that the network speed has deteriorated. For example, an increasing separation between the consecutively received segments 630-1 to 630-4, as illustrated by time periods T1, T1+S1, T1+S2, where S2>S1>0, is indicative of network congestion. When such a condition is determined or otherwise obtained, the client device 628 may activate a representation switching, e.g., by sending a websocket control message to request lower bitrate segments from the server 624. Conversely, if the client device 628 measures that the segments are arriving at faster than real time, the media can simply be buffered and no other action may be taken. As some jitter in the network speed may be expected and/or acceptable, appropriate network metrics executing at the client device 628 may apply a threshold level in the amount of jitter that can be tolerated, below which a determination may be made that the network conditions are acceptable. Reference numerals 636 and 638 in FIG. 6B refer to periods of transition and even segment separation, respectively.

Referring back to FIG. 6A, at block 602, appropriate network metrics executing at a client device (e.g., client 628) monitors incoming segments and measures the time (T) in between consecutive segments received via websocket interfacing. If T is longer than the segment length by a threshold amount (block 604), a determination that network conditions, e.g., download speed, are less than optimal for current bitrate resolutions (block 606). Appropriate control messages formatted as textual messages in JSON format may be generated to the server (e.g., server 624) via websocket interfacing therewith (block 608). For example, such messages may involve pausing or terminating the media presentation, or switching to a lower bitrate representation. In one implementation, at block 622, the client device 628 may continue to monitor (similar to block 602) if the media presentation session is kept alive.

If the measured inter-segment period (T) is substantially same as the segment length (block 610), a determination or assessment may be obtained that the network conditions are acceptable (block 612), whereupon the client device 628 may continue monitoring (block 622). On the other hand, if the inter-segment period (T) is shorter than the segment length (block 614), a determination or estimation may be obtained that network conditions may allow faster download times (block 616). As the media segments are being received at faster than real time, they may be buffered as needed (block 618). Depending on internal buffer conditions, rendering/processing efficiencies, etc., the client device 628 may generate appropriate control messages, including but not limited to switching to higher bitrate representations as may be indicated by a suitable adaptation logic module, to the server 624 via websocket interfacing as described hereinabove (block 620). Thereafter, the client device 628 may continue monitoring segment transmission characteristics as before (block 622). In one implementation, the client device 628 may be configured to "probe" the network in order to switch up to a higher bitrate representation. For example, it can request a few segments of the higher bitrate representation and, after a transition/transient period, reassess the network speed as set forth above, e.g., to determine if the conditions sustain even inter-segment separation.

It will be appreciated that in the methodology set forth above, no additional complexity is introduced (e.g., at the server) because it requires nothing other than media to be set through the websocket interface in normal course. As time measurements are made only at the client device, temporal disparity (i.e., out-of-sync clocks) between the server and client nodes does not pose a hurdle in assessing jitter/delay measurements.

Figure 7C:
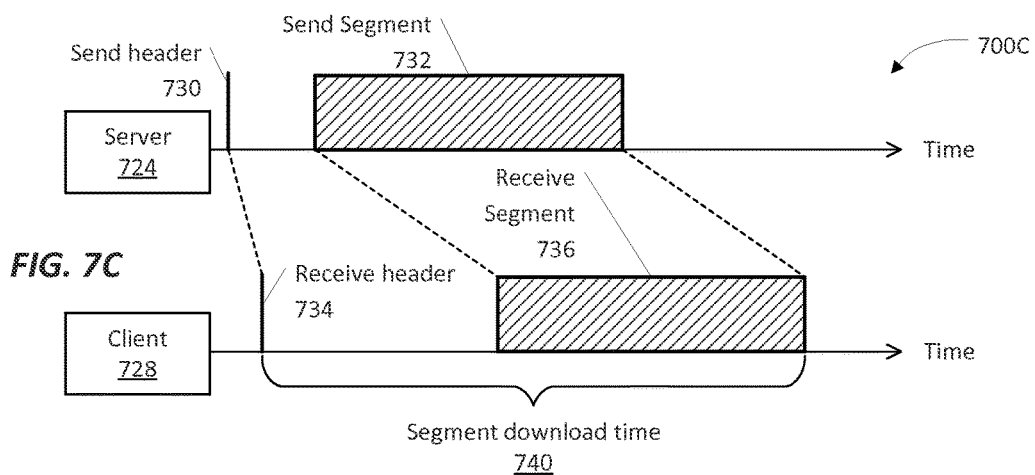
FIG. 7C depicts a graphical representation of media segment and associated header transmission in a temporal sequence that illustrates an aspect of the measurement methodology shown in the flowcharts of FIGS. 7A and 7B.
Figure 7A:
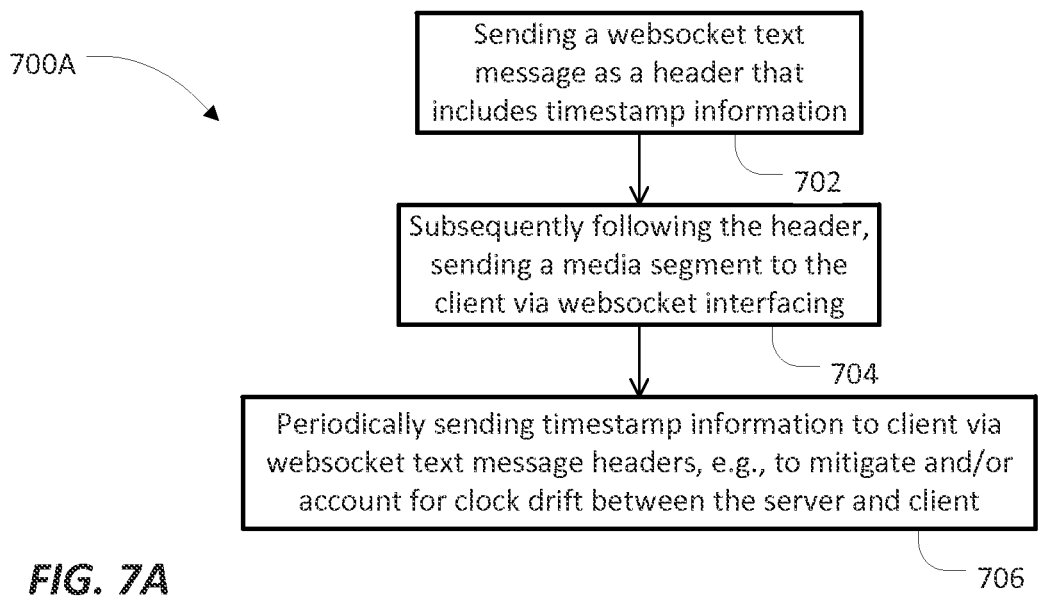
FIGS. 7A and 7B depict flowcharts with blocks relative to various steps and acts that may take place at a media server and associated client device, respectively, for facilitating measurement of appropriate network performance metrics in a websocket-enabled streaming environment according to another embodiment of the present patent application.
Figure 7B:
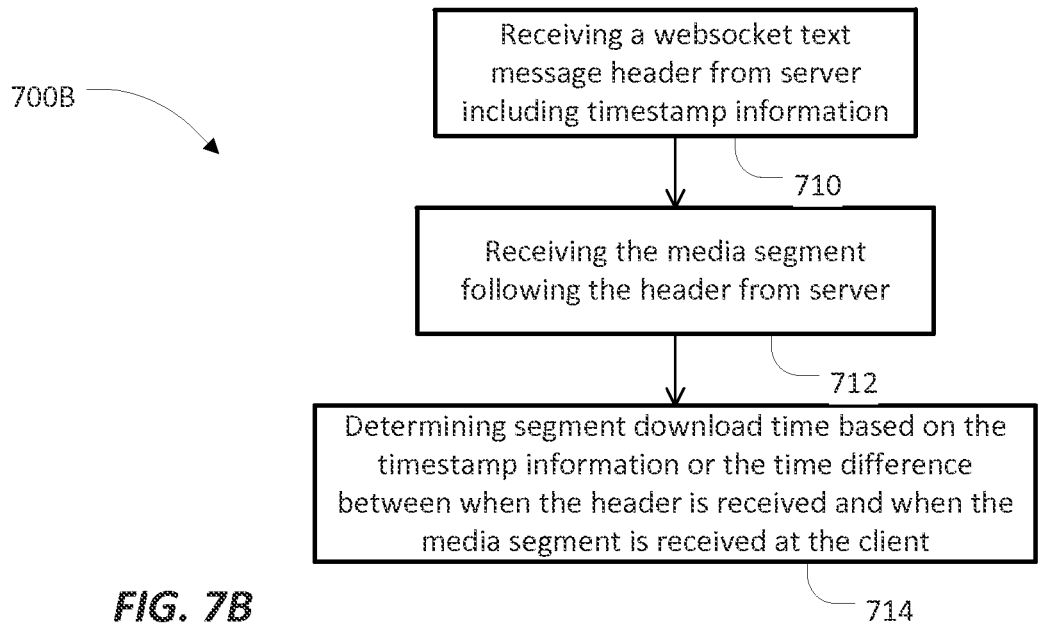

FIGS. 7A and 7B depict flowcharts with blocks relative to various steps and acts that may take place at a media server and associated client device, respectively, for facilitating measurement of appropriate network performance metrics in a websocket-enabled streaming environment according to another embodiment of the present patent application. FIG. 7C depicts a graphical representation 700C of media segment and associated header transmission in a temporal sequence that illustrates an aspect of the measurement methodology encompassed in the flowcharts of FIGS. 7A and 7B. The underlying methodological framework involves sending a text message before each media segment as a "header", wherein the send time may be provided as a timestamp, e.g., a Unix timestamp in milliseconds. The client would then calculate the download speed based on given send time and its own measured receive time. As there might be a disparity between the clocks on the server and client, the header timestamp information may be sent at certain fixed or variable time intervals (e.g., once every 10 seconds) in order to minimize the relative offset between the server and client clocks. In one variation, a client may be configured to ignore the time value written in the header and instead use the time at which the header was received, as shown in the graphical representation 700C of FIG. 7C. A server 724 may be provided with appropriate network metrics functionality configured to transmit a header 730 before sending a segment 732. Associated client device 728 is operative to note the time when the header is received and when the media segment is received, as illustrated by reference numerals 734 and 736, respectively. Appropriate network metrics functionality executing on the client device 728 may be configured to estimate the segment download time 740 as the difference between the two time values.

Reference numeral 700A in FIG. 7A refers to a relevant methodology of processes that may take place at a server (e.g., server 724). At block 702, the server 724 is operative to send a websocket text message (e.g., SM4 described hereinabove) as a header that includes the timestamp of a media segment following the header. Subsequently, e.g., potentially immediately following the header, the media segment is transmitted by the server at the designated time (block 704). As pointed out above, the server may periodically send timestamp headers ahead of corresponding media segments so as to mitigate or account for potential clock drift between the server and associated client (block 706). Reference numeral 700B in FIG. 7B refers to a relevant methodology of processes that may take place at a client device (e.g., client 728). At block 710, the client device receives a websocket text message (e.g., SM4) as a header that includes a timestamp of a media segment to follow. Thereafter, the client device 728 receives the media segment for which it has previously received the timestamp (block 712). Depending on whether the timestamp information is ignored or used, the client device 728 determines or otherwise estimates the segment download time, which may be used in assessing the network bandwidth conditions (block 714).

The methodology set forth above is fairly straightforward to implement at the client side, although it may slightly impact the overall bitrate because of the addition of header processing/transmission. It should be appreciated that instead of using JSON-formatted text messages as headers, binary JSON-formatted messages may be used in an alternative/additional implementation wherein the overall bitrate impact may be less since it can be more transmission-efficient.

Figure 8A:
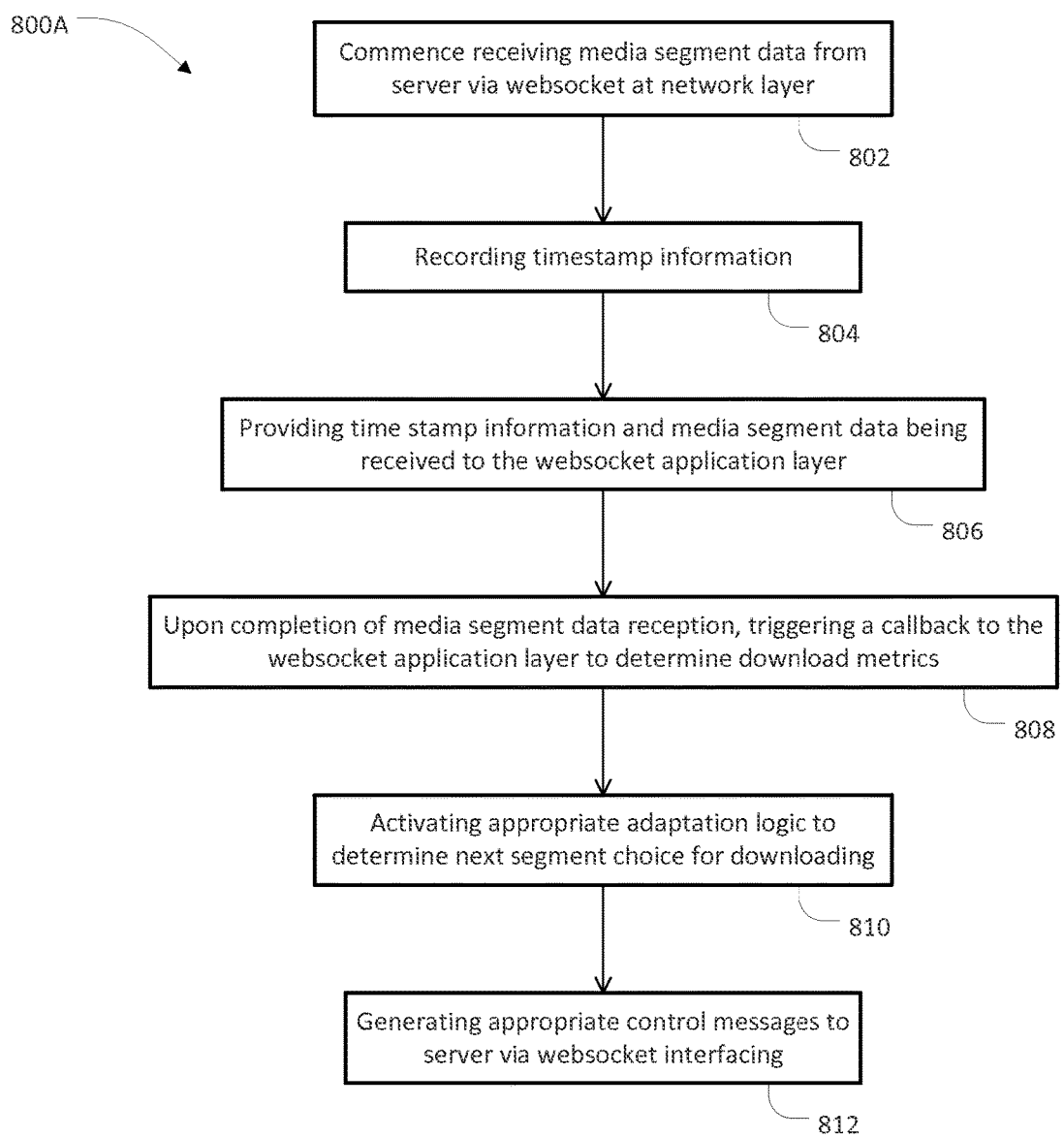
FIG. 8A is a flowchart with blocks relative to various steps and acts that may take place at a client device for measuring or otherwise estimating appropriate network performance metrics in a websocket-enabled streaming environment according to another embodiment of the present patent application.
Figure 8B:
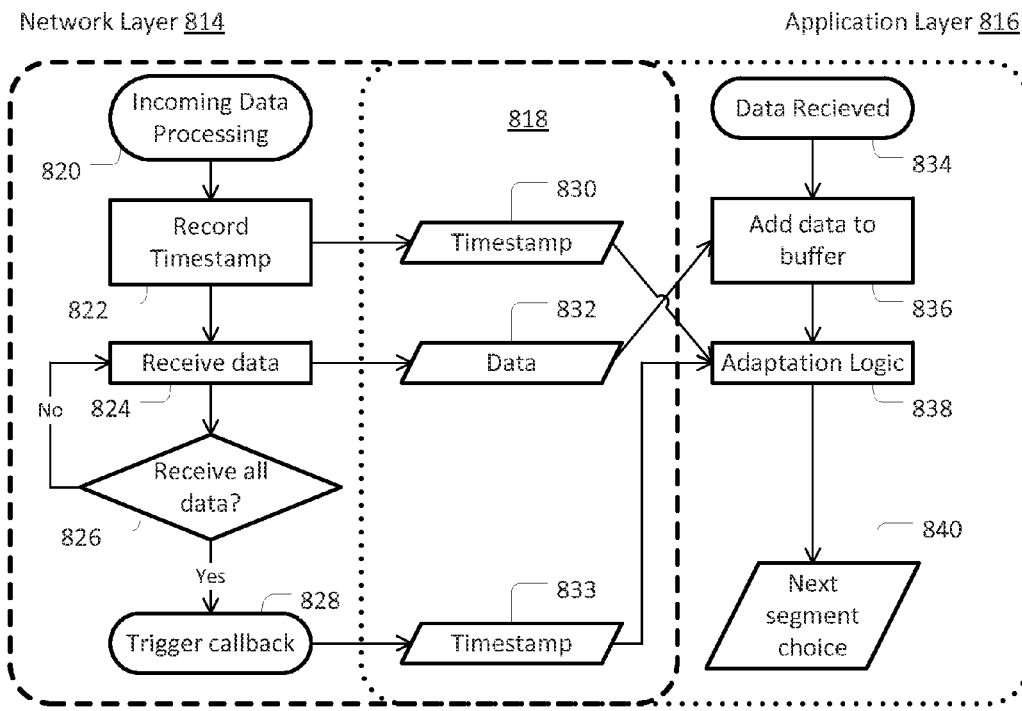
FIG. 8B is a functional block diagram of network layer and application layer components of a client websocket implementation that illustrates an aspect of the measurement methodology shown in the flowchart of FIG. 8A.

FIG. 8A is a flowchart with blocks relative to various steps and acts that may take place at a client device for measuring or otherwise estimating appropriate network performance metrics according to another embodiment. Relatedly, FIG. 8B is a functional block diagram of network layer and application layer components of a client websocket implementation 800B that illustrates an aspect of the measurement methodology 800A shown in the flowchart of FIG. 8A, wherein the underlying methodological framework involves exposing the time taken to receive a media segment to the application layer component. At block 802, the client device commences receiving a media segment from a media server via the websocket interface established therewith. As the segment data is being received at the network layer component of the websocket protocol stack, the start time of the incoming media segment is recorded as a timestamp (block 804), which is provided to the application layer component of the websocket protocol stack (block 806). Upon completion of receiving the entire media segment data, a callback function may be triggered (e.g., as an argument to the "message received" function) to the application layer component to determine download metrics (block 808). It should be appreciated that because both start and end times are recorded based on the same client clock, the measurements can be quite accurate. Furthermore, the overall transmission bitrate is not impacted as the methodology may be executed pursuant to normal downloading of segments. Depending on the download metrics, the application layer component of the websocket interface may active appropriate adaptation logic functionality to determine bitrate choices for the next or subsequent segments (block 810), whereupon suitable websocket control messages may be generated to the server (block 812).

Taking reference to example client websocket implementation 800B shown in FIG. 8B, a network layer component 814 and an application layer component 816 are illustrated with their respective operational blocks relative to the foregoing methodology. It will be recognized that there may be additional intermediary protocol layers in a websocket interface stack depending on its particular implementation. Accordingly, reference numeral 818 is illustrative of any processing or protocol layer tunneling functionality necessary for transmitting timestamp information 830 and media segment data 832 between the network and application layer components 814, 816. At the network layer component 814, blocks 820, 822, 824 and 826 relate to the processes of incoming data reception, timestamping and verifying that all media segment data has been received, as explained hereinabove. After determining that the entire segment has been received, the network layer component triggers a callback function (block 828) that includes an end time 833 to an adaptation logic structure 838 executing as part of the websocket application layer component 816. Also, as the segment media data is being received at the application layer component 816 from the network layer component 814, it may be buffered as needed, as set forth at blocks 834 and 836. Further, the adaptation logic 838 is operative to determine the segment download times based on the timestamp information 830, 833, and, responsive thereto, effectuate a selection choice for subsequent segments (block 840).

Figure 9B:
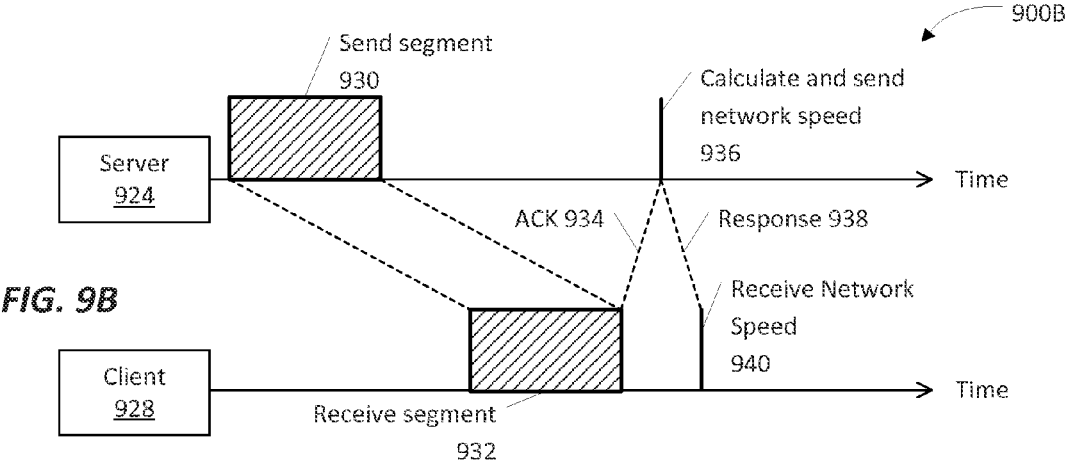
FIG. 9B depicts a graphical representation of media segment transmission and acknowledgement reception in a temporal sequence that illustrates an aspect of the measurement methodology shown in the flowchart of FIG. 9A.
Figure 9A:
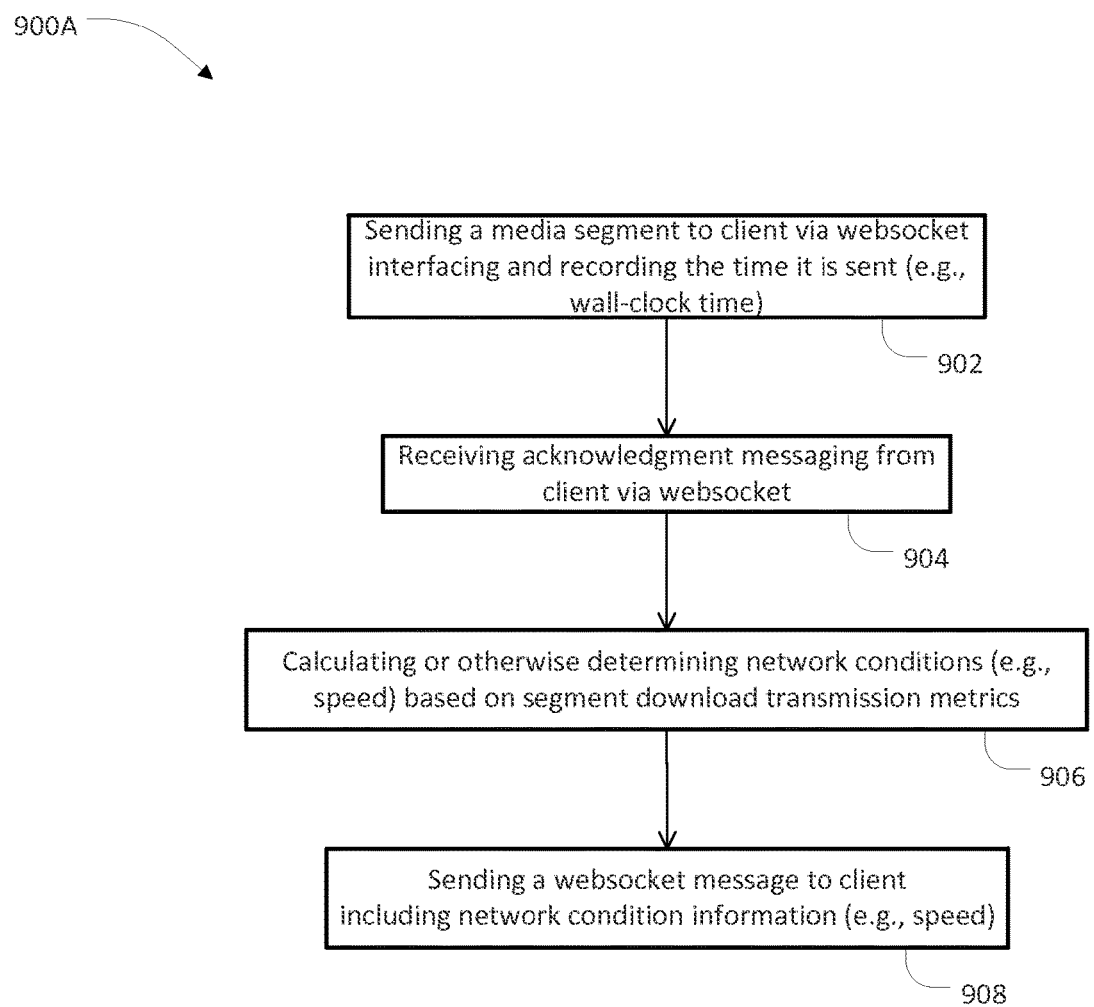
FIG. 9A is a flowchart with blocks relative to various steps and acts that may take place at a server for measuring or otherwise estimating appropriate network performance metrics in a websocket-enabled streaming environment according to yet another embodiment of the present patent application.
Figure 10:
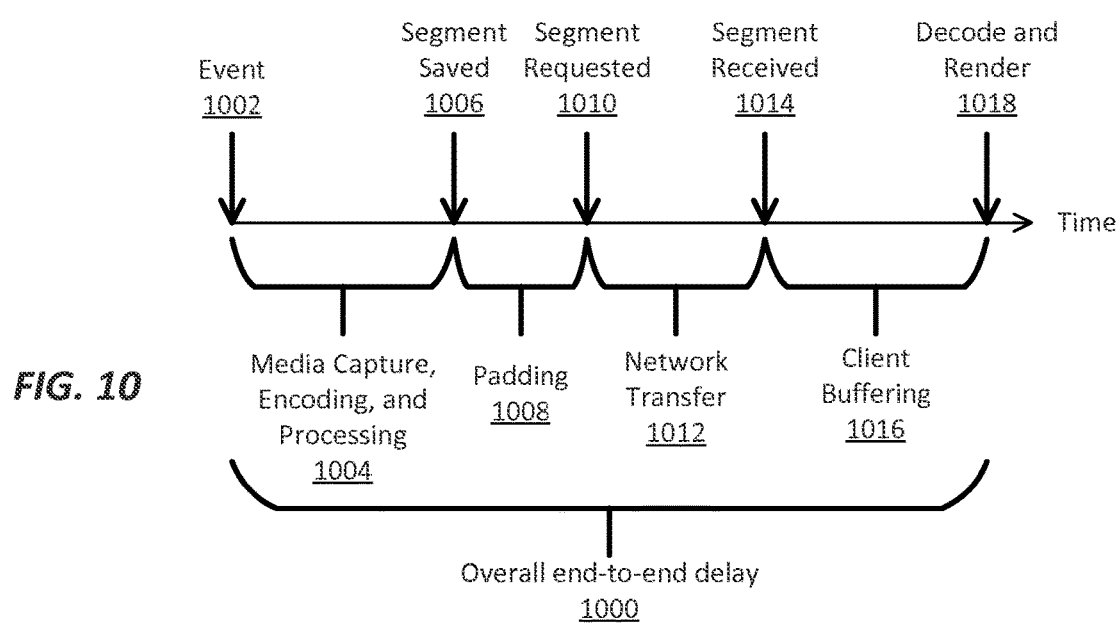
FIG. 10 depicts a graphical representation of live media segment generation and transmission in a temporal sequence that illustrates overall end-to-end delay in an example ABR streaming environment.

In addition to the foregoing client-based measurement methodologies, a server-based measurement methodology 900A is set forth in FIG. 9A. Relatedly, FIG. 9B depicts a graphical representation 900B of media segment transmission and acknowledgement reception in a temporal sequence that illustrates an aspect of the measurement methodology 900A shown in the flowchart of FIG. 9A, wherein segment transmission 930 and reception 932 are illustrated relative to a server 924 and associated client device 928, respectively. Upon receiving the media segment, suitable service logic executing at the client device 928 is operative to generate an acknowledgement (e.g., ACK) as a control message in JSON format (e.g., CM7 described hereinabove) to the server 924, exemplified by reference numeral 934. Appropriate network metrics functionality executing at the server 924 is operative to calculate or otherwise determine the network speed based on when the segment was sent and when the acknowledgement was received, as exemplified by reference numeral 936. The server 924 is further configured to transmit the network speed information via a suitable server control message in JSON format (e.g., SM5 described hereinabove) as a response message 938. Appropriate adaptation logic executing at the client device 928 is operative responsive to the received network speed information in order to effectuate applicable representation switching as needed.

Server-based acts and processes relative to the foregoing scheme are set forth in the flowchart of FIG. 9A. At block 902, a server (e.g., server 924) sends a media segment to associated client (e.g., client device 928) via the websocket interfacing established therewith. A timestamp of when the media segment is transmitted may be recorded based on the server's wall-clock. A JSON-formatted acknowledgement is received as a control message from the client device 928 via the websocket (block 904). Responsive thereto, the server 924 is operative to assess the network conditions based on the download transmission metrics and provide that information to the client device as set forth above (blocks 906, 908). Those skilled in the art will recognize that although JSON-formatted textual messages have been illustrated in the above embodiments for control messaging purposes, binary JSON-formatted messages may also be employed in certain variations, mutatis mutandis.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A client device configured to receive live media from a media server, the client device comprising:
   one or more processors;
   a media player; and
   a HyperText Transfer Protocol (HTTP) client module and a websocket client module coupled to the one or more processors, wherein the one or more processors are operative to control the HTTP client and websocket client modules and execute associated program instructions configured to:
   initiate an HTTP connection with the media server;
   initiate a handshake transaction with the media server to open a bidirectional websocket interface over an underlying Transmission Control Protocol (TCP) connection;
   facilitate generating a message to the media server to initiate transmission of a live media programming stream in a websocket session;
   facilitate receiving media segments from the media server of the live media programming stream in real time via a websocket connection during the websocket session for playback by the media player, whereby padding latency at the media server for the websocket session is reduced;
   maintain control of the websocket session by the client device based on comparing a received segment's length with a varying inter-segment time period monitored by the client device and activating a bitrate representation switching with respect to the media segments responsive thereto; and
   a control message generator operative to generate control messages as text messages for transmission to the media server via the websocket interface, wherein a text message is configured for commencing transmission of the live media programming stream at a live point with a specified delay.

2. The client device as recited in claim 1, further comprising a network metrics and adaptation logic module for generating a network control message to the media server indicative of network bandwidth conditions based on a measurement of a change in time between consecutive media segments received by the client device.

3. The client device as recited in claim 1, wherein the control message generator is further operative to generate a text message to the media server for resuming transmission of the live media programming stream from a last known position at which streaming of the media segments was paused.

4. A method operating at a client device configured to receive live media from a media server, the method comprising:
   initiating a HyperText Transfer Protocol (HTTP) connection with the media server;
   initiating a handshake transaction with the media server to open a bidirectional websocket interface over an underlying Transmission Control Protocol (TCP) connection;
   generating a message to the media server to initiate transmission of a live media programming stream in a websocket session;
   receiving media segments from the media server of the live media programming stream in real time via a websocket connection during the websocket session for playback by a media player, whereby padding latency at the media server for the websocket session is reduced;
   maintaining control of the websocket session based on comparing a received segment's length with a varying inter-segment time period monitored by the client device and activating a bitrate representation switching with respect to the media segments responsive thereto; and
   generating one or more text messages for transmission to the media server via the websocket interface, wherein a text message is configured for commencing transmission of the live media programming stream at a live point with a specified delay.

5. The method as recited in claim 4, further comprising obtaining, in an out-of-band communication channel, media presentation data structures from the media server with respect to the media segments of the live media programming stream, wherein the media segments are encoded at multiple bit rates identified in the media presentation data structures.

6. The method as recited in claim 5, further comprising obtaining initialization segments with respect to the media segments in a communication channel other than the websocket session with the media server.

7. The method as recited claim 4, further comprising generating a network control message to the media server indicative of network bandwidth conditions based on a measurement of a change in time between consecutive media segments received by the client device.

8. The method as recited in claim 4, further comprising generating a text message to the media server for resuming transmission of the live media programming stream from a last known position at which streaming of the media segments was paused.

9. The client device as recited in claim 1, wherein the control message generator is further operative to generate a text message to the media server for terminating transmission of the live media programming stream while keeping the websocket interface open.

10. The client device as recited in claim 1, wherein the control message generator is further operative to generate a text message to the media server for switching to transmission of the media segments encoded in a bitrate different from the bitrate of the media segments currently being received.

11. The client device as recited in claim 1, further comprising a network metrics and adaptation logic module for generating a network control message to the media server indicative of network bandwidth conditions based on a measurement of download speed that is determined by the client device responsive to a time difference between when a text header and a media segment corresponding to the text header are received by the client device.

12. The client device as recited in claim 1, further comprising a network metrics and adaptation logic module for generating a network control message to the media server indicative of network bandwidth conditions based on a determination by an application layer module executing to determine a time difference between when a media segment download commences and when the media segment download is completed at a network layer of the client device's websocket interface.

13. The method as recited in claim 4, further comprising generating a text message to the media server for terminating transmission of the live media programming stream while keeping the websocket interface open.

14. The method as recited in claim 4, further comprising generating a text message to the media server for switching to transmission of the media segments encoded in a bitrate different from the bitrate of the media segments currently being received.

15. The method as recited in claim 4, further comprising generating a network control message to the media server indicative of network bandwidth conditions based on a measurement of download speed that is determined by the client device responsive to a time difference between when a text header and a media segment corresponding to the text header are received by the client device.

16. The method as recited in claim 4, further comprising generating a network control message to the media server indicative of network bandwidth conditions based on a determination by an application layer module executing to determine a time difference between when a media segment download commences and when the media segment download is completed at a network layer of the client device's websocket interface.

17. A client device configured to receive live media from a media server, the client device comprising:
   one or more processors;
   a media player; and
   a HyperText Transfer Protocol (HTTP) client module and a websocket client module coupled to the one or more processors, wherein the one or more processors are operative to control the HTTP client and websocket client modules and execute associated program instructions configured to:
   initiate an HTTP connection with the media server;
   initiate a handshake transaction with the media server to open a bidirectional websocket interface over an underlying Transmission Control Protocol (TCP) connection;
   facilitate generating a message to the media server to initiate transmission of a live media programming stream in a websocket session;
   facilitate receiving media segments from the media server of the live media programming stream in real time via a websocket connection during the websocket session for playback by the media player, whereby padding latency at the media server for the websocket session is reduced;
   maintain control of the websocket session by the client device based on comparing a received segment's length with a varying inter-segment time period monitored by the client device and activating a bitrate representation switching with respect to the media segments responsive thereto; and
   a control message generator operative to generate control messages as text messages for transmission to the media server via the websocket interface, wherein a text message is configured for commencing transmission of the live media programming stream from a particular point in a wall-clock time associated with the live media programming stream.

* * * * *